United States Patent
Hammond et al.

(10) Patent No.: US 9,128,695 B2
(45) Date of Patent: Sep. 8, 2015

(54) REMOTE ACCESS APPLIANCE WITH BACKUP POWER SYSTEM

(75) Inventors: Russell C. Hammond, Rogersville, AL (US); Timothy A. Johnson, New Hope, AL (US)

(73) Assignee: Avocent Huntsville Corp., Huntsville, AL (US)

( * ) Notice: Subject to any disclaimer, the term of this patent is extended or adjusted under 35 U.S.C. 154(b) by 84 days.

(21) Appl. No.: 13/877,534

(22) PCT Filed: Sep. 29, 2011

(86) PCT No.: PCT/US2011/054005
§ 371 (c)(1),
(2), (4) Date: May 9, 2013

(87) PCT Pub. No.: WO2012/047713
PCT Pub. Date: Apr. 12, 2012

(65) Prior Publication Data
US 2013/0227315 A1    Aug. 29, 2013

Related U.S. Application Data

(60) Provisional application No. 61/389,616, filed on Oct. 4, 2010, provisional application No. 61/488,644, filed on May 20, 2011.

(51) Int. Cl.
*H04L 12/28* (2006.01)
*G06F 1/30* (2006.01)
*G06F 1/26* (2006.01)

(52) U.S. Cl.
CPC . *G06F 1/30* (2013.01); *G06F 1/266* (2013.01)

(58) Field of Classification Search
None
See application file for complete search history.

(56) References Cited

U.S. PATENT DOCUMENTS 7,428,606 B2    9/2008  Liu et al.
2006/0112288 A1*  5/2006  Schindler .................. 713/300

(Continued)

FOREIGN PATENT DOCUMENTS

| CN | 101482771 A | 7/2009 |
| CN | 101504598 A | 8/2009 |
| JP | 2007058310 A | 3/2007 |

OTHER PUBLICATIONS

International Search Report and Written Opinion for PCT/US2011/054005, mailed Apr. 3, 2012; ISA/EP.

*Primary Examiner* — Chi H Pham
*Assistant Examiner* — Fahmida Chowdhury
(74) *Attorney, Agent, or Firm* — Harness, Dickey & Pierce, P.L.C.

(57) ABSTRACT

A remote access appliance ("appliance") having a backup power subsystem for powering a digital rack interface pod ("DRIP") that is interfacing the appliance to a remote device. The backup power subsystem may involve the use of at least one shunt regulator subsystem that is adapted to control backup power to the DRIP in the event the DRIP loses power from a USB port of the remote device while a session is in progress with the remote device. The backup power subsystem automatically applies and regulates the power available to the power pins on the RJ-45 port of the appliance to power the DRIP. In the event the DRIP is unplugged form the RJ-45 port of the appliance while backup power is being drawn by the DRIP, the backup power subsystem virtually immediately removes power being applied to the predetermined pins of the RJ-45 port of the appliance. The backup power sub system further will not make power available to the power pins of the RJ-45 port on the appliance unless predetermined operating conditions are present with the DRIP.

21 Claims, 5 Drawing Sheets

(56) References Cited

U.S. PATENT DOCUMENTS

| | | |
|---|---|---|
| 2007/0165548 A1 | 7/2007 | Woo et al. |
| 2008/0040527 A1 | 2/2008 | Filipov et al. |
| 2008/0235523 A1* | 9/2008 | Hussain ........................ 713/300 |
| 2008/0278508 A1* | 11/2008 | Anderson et al. ............. 345/519 |
| 2009/0177901 A1 | 7/2009 | Chen et al. |
| 2009/0198848 A1 | 8/2009 | Chien |
| 2011/0260541 A1* | 10/2011 | Huang et al. .................... 307/66 |
| 2012/0104994 A1* | 5/2012 | Esnard-Domerego et al. ............................ 320/107 |
| 2012/0287774 A1* | 11/2012 | Hinkle et al. ................. 370/216 |

* cited by examiner

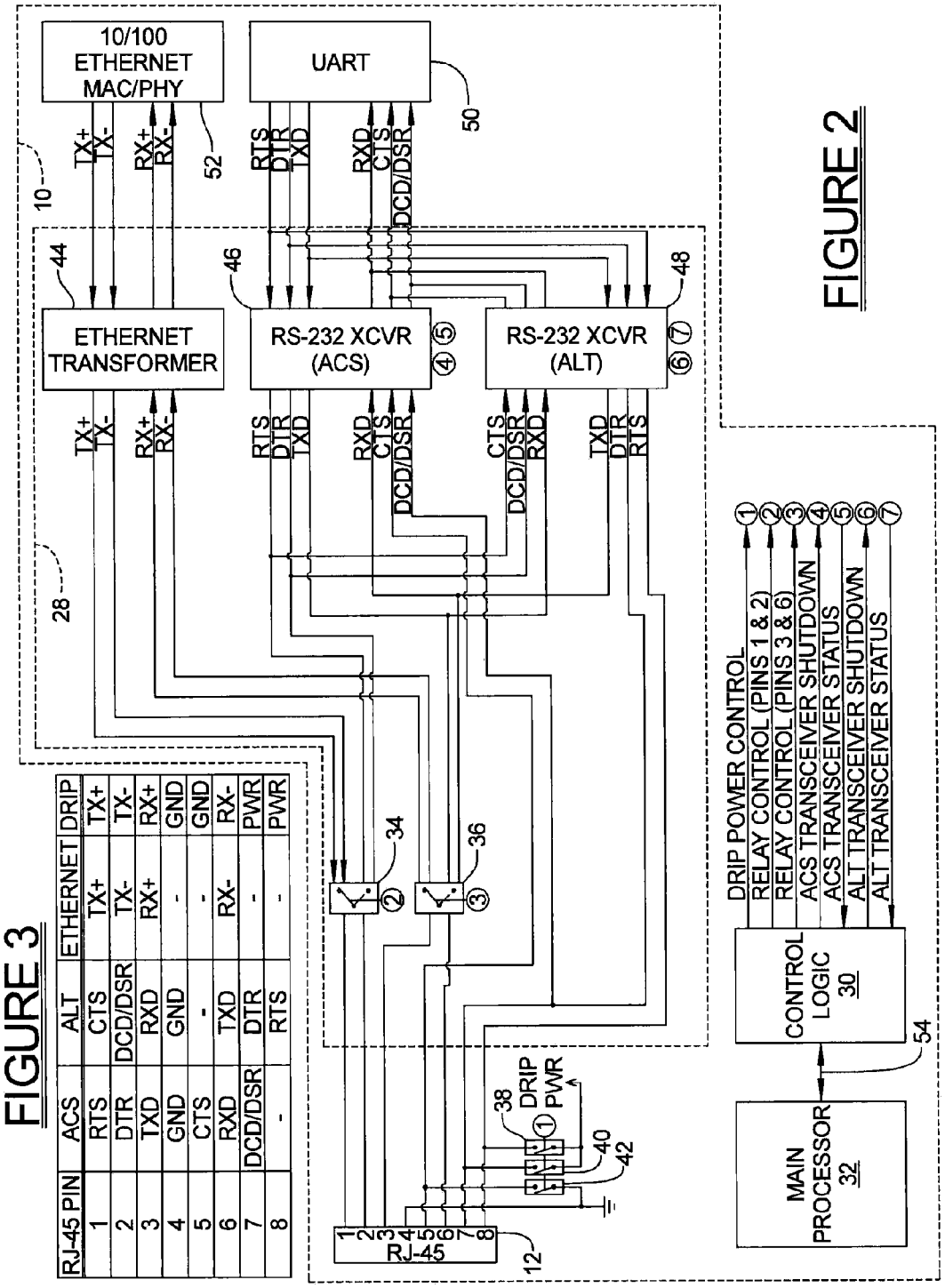

REMOTE ACCESS APPLIANCE WITH BACKUP POWER SYSTEM

CROSS-REFERENCE TO RELATED APPLICATIONS

This application claims the benefit of U.S. Provisional Application No. 61/389,616 filed on Oct. 4, 2010 and U.S. Provisional Application No. 61/488,644 filed on May 20, 2011. The disclosures of the above applications are incorporated herein by reference.

FIELD

The present disclosure relates to remote access appliances used in modern day data centers, and more particularly to a remote access appliance having a backup power system that is able to automatically provide backup power to a digital rack interface pod (DRIP) which is interfacing the appliance to a server, to thus power the DRIP, in the event the DRIP loses power from the server.

BACKGROUND

The statements in this section merely provide background information related to the present disclosure and may not constitute prior art.

Remote access appliances are used frequently in modern day data centers to interface with and establish communications links with a plurality of servers or other serial or Ethernet type devices. Traditionally this has required separate remote access appliances, one for Ethernet and one for serial. In one implementation, the assignee of the present application, Avocent Corp., may also use the Ethernet interface on the remote access appliance to receive digitized data from a digital rack interface pod (DRIP), where the DRIP is interfaced between the server and the remote access appliance. The DRIP receives analog video signals from the server, converts this information to a digital format, and then forwards the digital information in Ethernet protocol format to the appliance. The DRIP also interfaces with a USB interface on the server to allow for sending and receiving USB data between the server and the remote session enabled by the appliance. The USB traffic of data between the appliance and the DRIP is packetized and sent in the Ethernet protocol.

When using a DRIP to interface the appliance to a remote server, typically the DRIP receives power from a USB port of the server. In the event that the server loses power and shuts down, and is then powered back up a short time later, often the server will delay applying power to the designated power pins of its USB port for at least several seconds while it begins to re-boot. This means that power will not be applied to the DRIP when the server begins to re-boot. At some point during the boot-up process the server will again begin applying power to the appropriate pins of its USB port, which will then power up the DRIP again, allowing a remote user to establish a new session with the DRIP and the server.

In the event a data center person needs to troubleshoot the server, the above scenario is undesirable because the BIOS screen, which typically is generated during the first few seconds of the boot-up process, will not be captured by the DRIP. This is because the server will typically not yet have applied power to its USB port, and thus the DRIP will not yet be powered up with a session in progress with a remote user. As those skilled in the art will appreciate, the ability to capture the BIOS screen, and navigate through and perform configuration of the BIOS software and its settings, is a significant advantage when it comes to remotely attempting to troubleshoot a problem with a server.

SUMMARY

In one aspect the present disclosure relates to a remote access appliance. The remote access appliance is adapted to enable a keyboard, video and mouse (KVM) session with a remote computing device. The remote access appliance may further provide back-up power to an Ethernet device in communication with an output port of the appliance, where the Ethernet device is interfacing the appliance to the remote computing device. The appliance may comprise a backup power subsystem that may include a powering subsystem associated with a signal line of the output port for supplying a regulated power signal to the signal line of the output port. A controller may also be included for enabling and disabling an output from the powering subsystem when communication with the Ethernet device is interrupted.

In another aspect the present disclosure may relate to a remote access appliance adapted to enable a keyboard, video and mouse session with a remote computing device, and further being adapted to provide back-up power to an Ethernet device in communication with an output port of the appliance, where the Ethernet device is interfacing the appliance to the remote computing device. The appliance may comprise a back-up power subsystem that having a first powering subsystem associated with a first signal line of the output port, and a first switching element associated with the first powering subsystem, and the first output pin. A second powering subsystem may be included which is associated with a second signal line of the output port. A second switching element may be included that is associated with the second powering subsystem. A controller may be included which is configured to detect when the Ethernet device has been connected to the output port, and upon the detection of the Ethernet device, to control the first and second switching elements to enable regulated power signals to be applied to the first and second signal lines of the output from the back-up power subsystem.

In still another aspect the present disclosure may relate to a method for controlling a remote access appliance, wherein the appliance is adapted to enable a keyboard, video and mouse session with a remote computing device, and further such that the appliance is able to provide back-up power to an Ethernet device in communication with an output port of the appliance. The Ethernet device may be interfacing the appliance to the remote computing device. The method may include using a main processor of the appliance to sense when the Ethernet device is in communication with an output port of the appliance. The method may also include enabling a back-up power subsystem to apply back-up power to the Ethernet device only when the Ethernet device has been detected as being in communication with the appliance through the output port. The method may further include using the back-up power subsystem to monitor a level of current drawn by the Ethernet device when the back-up power subsystem is powering the Ethernet device. The method may also involve interrupting power from the back-up power subsystem to the output port when the Ethernet device is detected as no longer being in communication with the output port.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 2 is an electrical schematic diagram of an autosensing subsystem of the remote access appliance that detects whether an Ethernet or serial protocol device has been connected to a communications port on the remote access appliance via a communications cable, and also which is able to detect which one of two predetermined pinouts for the plug of the cable is being used when the cable is transmitting information to and from the remote access appliance using a serial protocol;

FIG. 3 is a table showing the pinout configuration of the RJ-45 jack on the remote access appliance when a serial connection is established with a serial device using an ACS pinout, when a serial connection is established with a serial device using an alternative ("Alt") serial pinout, when a connection is established with an Ethernet device, and when a digital rack interface pod ("DRIP") is coupled to the RJ-45 jack.

DETAILED DESCRIPTION

Figure 1A:
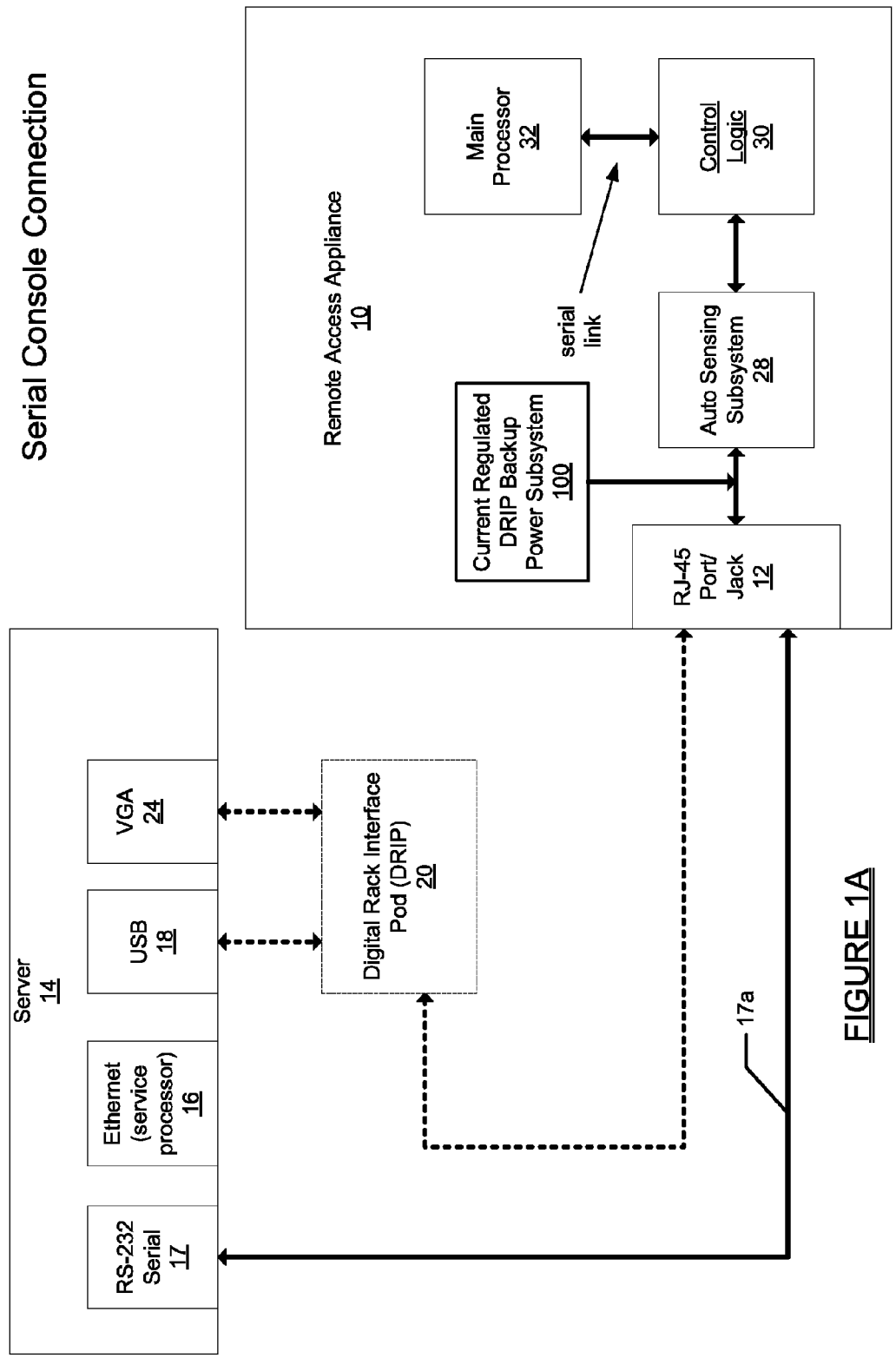
FIGS. 1A-1C are high level block diagrams illustrating several different types of connections that may be made between a communications port of a remote access appliance and a remote server.

The following description is merely exemplary in nature and is not intended to limit the present disclosure, application, or uses. It should be understood that throughout the drawings, corresponding reference numerals indicate like or corresponding parts and features.

Figure 1B:
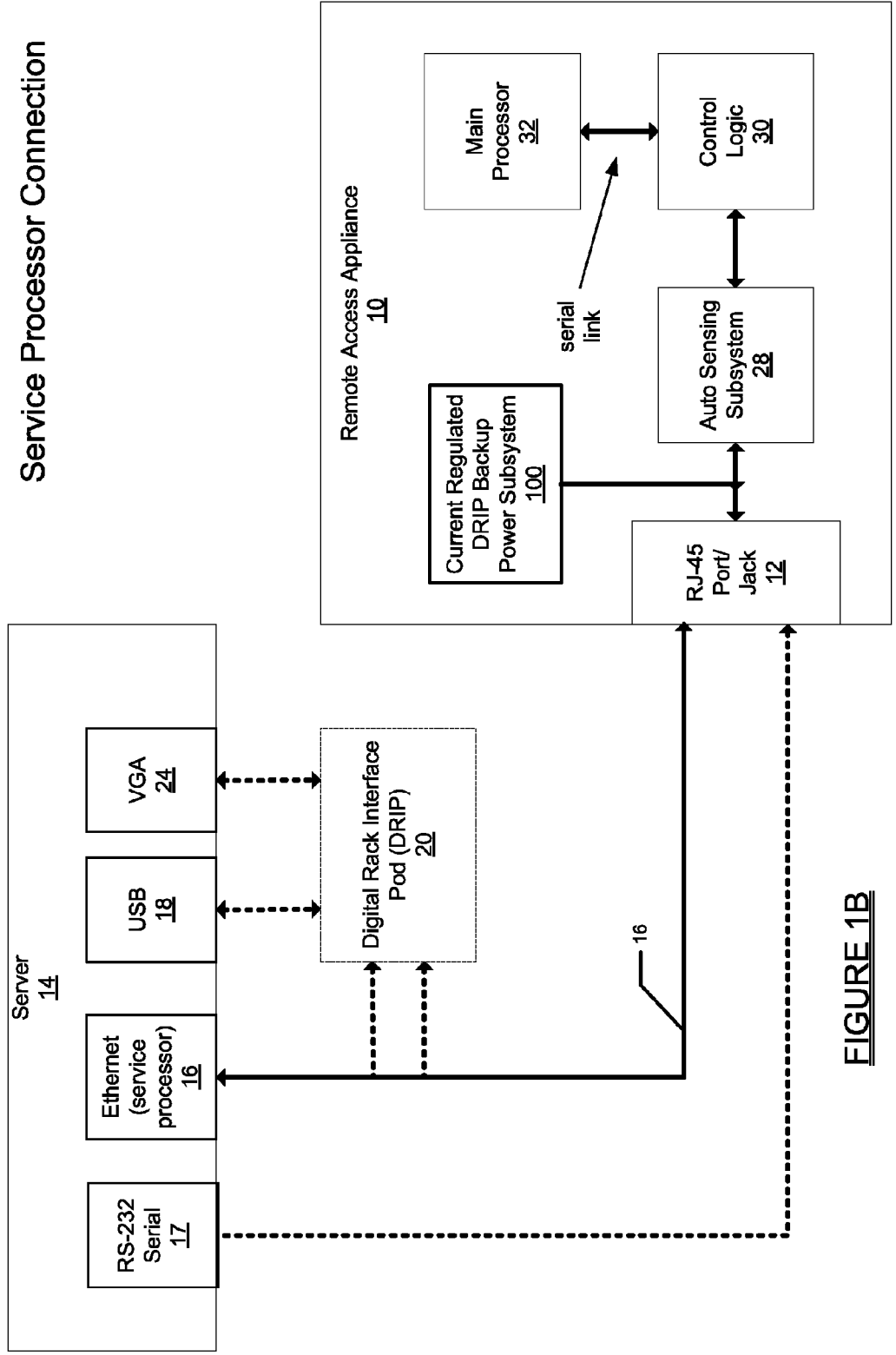
Figure 1C:
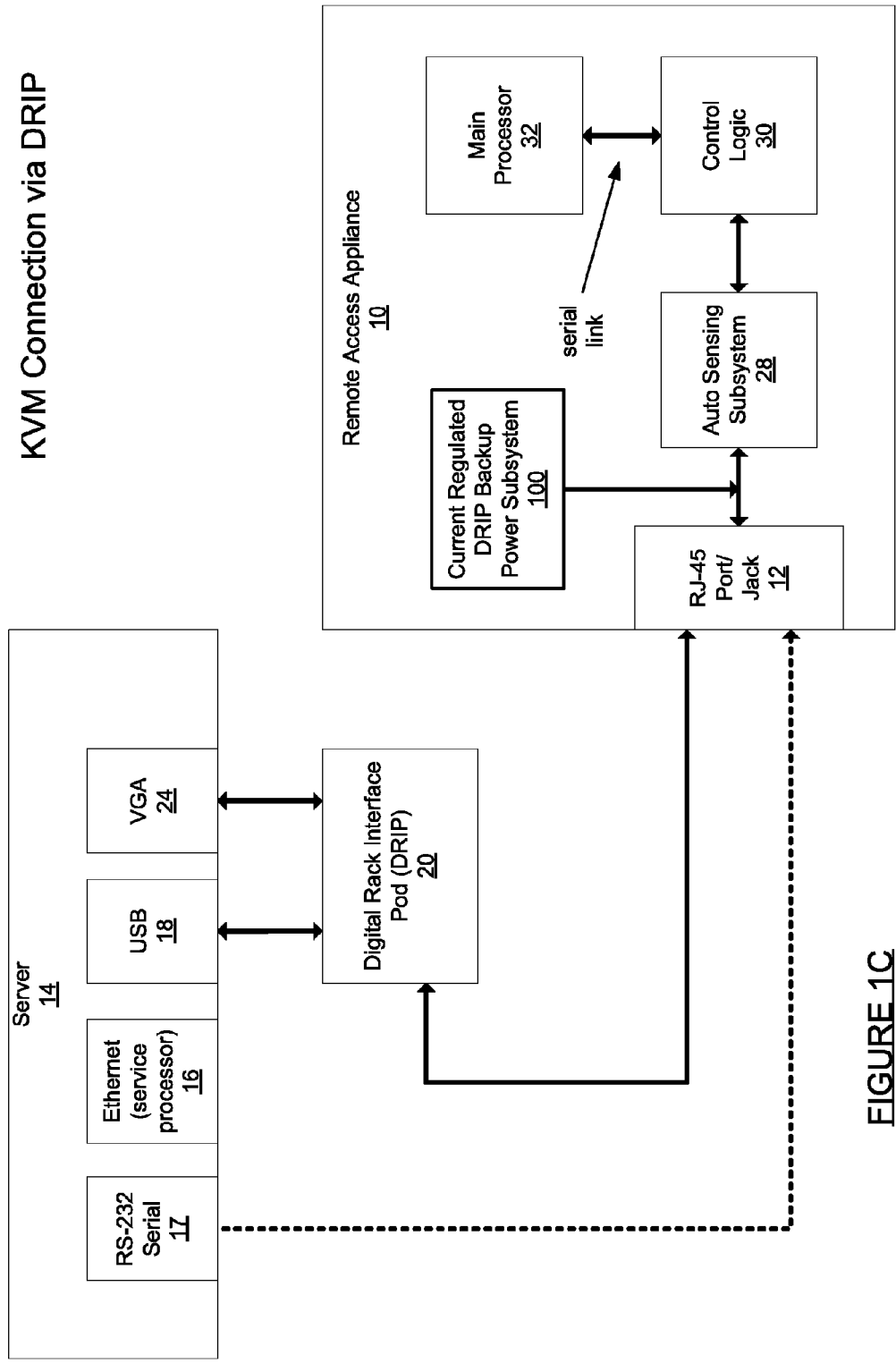

Referring to FIGS. 1A-1C, there is shown a remote access appliance 10 in accordance with one embodiment of the present disclosure. For convenience the remote access appliance 10 will be referred to throughout the following discussion simply as "appliance 10". The appliance 10 has a port shown as a RJ-45 port (i.e., jack) 12, which may be connected to a server 14 in at least three different ways. However, it will be appreciated that while the following discussion references a connection to a server, that the appliance 10 may be connected to many other types of devices. For example, many of the RS232 serial Avocent made appliance's connections are to other equipment than a server. Very common are connections to "smart" power strips made by Avocent Corp. and other manufacturers, and routers are very commonly connected to (either directly in an RJ-45 RS232 console or configuration port, or by way of a RJ to DB9 adapter). And, the appliance 10 would also typically support a serial console application at the remote user to operate with any other serial device. But again, for the following discussion, a connection between the appliance 10 and the server 14 will be used for explanation purposes.

FIG. 1A illustrates a first way in which a cable 17a, which is typically a Cat5 cable, is used to connect the RJ-45 port 12 of the appliance 10 to an RS-232 port of the server 14. This connection could also be made by using a RJ-45 to DB-9 adapter on the RJ45 cable end of the CAT5 cable from the appliance 10 to the server 14, such that the server doesn't have to have an RJ-45 interfaced serial port.

FIG. 1B illustrates a second way in which a cable 16b, typically a Cat5 cable, is used to connect the RJ-45 port 12 to an Ethernet port 16 of the server 14. Typically this type of connection enables the server's Service Processor (SP) to communicate various types of relevant information on the performance of the server (e.g., processor utilization, temperature, etc.) to the appliance 10 using the Ethernet communications protocol. In this configuration there is only the Cat5 cable between the port of the appliance 10 and the Ethernet port 16 that is associated with the service processor of the server 14. It should also be understood that the "Ethernet (service processor) 16" interface is only Ethernet by way of protocol, and is not the server's 14 main Ethernet interface. That is, this interface is only for the purpose of a subsystem (i.e., the Service Processor) on the server 14 that monitors the "health," performance, total utilization (CPU bandwidth, RAM, etc.), temperatures, etc. relating to the server 14.

FIG. 1C shows a third type of connection that involves the use of a digital rack interface pod ("DRIP") 20. The DRIP 20 may be coupled via a cable 20a to the RJ-45 port 12 of the appliance 10. The DRIP 20 may also be coupled via a suitable cable 26 to a universal serial bus (USB) port 18 of the server 14, and via a suitable cable 22 to a VGA port 24. The USB port 18 enables keyboard and mouse related information to be transmitted to and from the server 14 in serial form. The DRIP 20 is available from Avocent Corp. of Huntsville, Ala. The DRIP 20 operates to digitize video signals from the VGA port 24 of the server 14 and to place same in Ethernet form for transmission to the appliance 10. The DRIP 20 also functions to convert serial format signals from the USB port 18 to Ethernet format. The appliance 10 also may include an autosensing subsystem 28, a control logic subsystem 30 a main processor 32, and a current regulated DRIP backup power subsystem 100, to be discussed in the following paragraphs in connection with FIG. 4.

As will be appreciated then, the appliance 10 may need to communicate using either Ethernet protocol signals or serial protocol signals via its RJ-45 port 12, depending on what type of device is communicating with the appliance. The appliance 10 provides the significant advantage of being able to automatically sense whether Ethernet protocol signals or serial protocol signals are being received at its RJ-45 port without any intervention from a data center individual. This is accomplished by the autosensing subsystem 28 and the control logic subsystem 30 working in combination with the main processor 32. The autosensing subsystem 28 effectively monitors the signals received on the RJ-45 port 12 and, in connection with the control logic subsystem 30 and the main processor 32, automatically internally configures various electronic components so that communications can be appropriately routed and handled within the appliance 10.

One significant benefit of the above-described autosensing feature is a potential reduction in the number of ports that need to be included on the appliance 10. Another significant advantage of an "autosensing" port as described herein, is that the appliance 10 is able to determine what to configure to without being told whether the other device is serial, KVM alone (i.e., no service processor subbed out), service processor alone, or a combination of KVM and service processor. The advantage of having a switchable port (whether done by port autosensing or by manual configuration) is that with x number of ports on an appliance (e.g., 40), a user can add the next thing to connect to and so long as its one of the things supported (i.e., service processor alone, serial, KVM, or KVM and service processor), the user has a port available for the next device to be coupled to. Thus, the port autosensing feature can potentially enable a reduction of ports needed to support all things while expanding the connections on the appliance 10.

Referring now to FIG. 2, a schematic diagram of a portion of the appliance 10 is shown that illustrates in greater detail the autosensing subsystem 28 and the control logic subsystem 30. The autosensing subsystem is denoted by dashed line 28. A first semiconductor relay 34 is coupled to pins 1 and 2 of the jack that forms the RJ-45 port 12. A second semiconductor relay 36 is coupled to pins 3 and 6 of the same jack. A plurality of transistor switch paths 38 and 40 may be incorporated for coupling DC power to the DRIP 20 and transistor switch path 42 may be provided for providing an additional ground path for the DRIP (additional to that of the always-present ground path on RJ-45 port 12 pin 4). The first semiconductor relay 34 is coupled to an Ethernet transformer 44 and a first RS-232 transceiver 46. The first RS-232 transceiver 46 in this example is adapted to be used when a serial connection is made at the RJ-45 port 12 with the mating RJ-45 plug having an ACS pinout configuration. The ACS pinout configuration is a pinout configuration recognized in the industry and used by Avocent Corp. on the serial ports of various forms of data center equipment available from Avocent Corp. A second RS-232 transceiver 48 is incorporated and designated with the notation "Alt", which is used for serial devices that require a different, predetermined pinout configuration. The specific Alt pinout configuration given in the Table of FIG. 3 is used for various serial devices made by Cisco Corp. and others. It will be appreciated that other pairs of pinouts may potentially be incorporated, and the present disclosure is not limited to use with any two specific pinout configurations.

As will be explained in greater detail in the following paragraphs, it is also a significant benefit that the autosensing subsystem 28 is able to automatically detect whether the ACS pinout or the Alt pinout is being used with the RJ-45 plug (and thus with the external serial device) that is connected to the RJ-45 port 12. This feature will also be described in greater detail in the following paragraphs. The ACS and Alt pinouts are shown in the table of FIG. 3 along with a pinout for an Ethernet connection and a pinout used by an Avocent Corp. manufactured DRIP 20.

Referring further to FIG. 2, both of the RS-232 transceivers 46 and 48 are coupled to a universal asynchronous receiver/transmitter (UART) 50, and the Ethernet transformer 44 is coupled to a 10/100 Ethernet/MAC/PHY interface subsystem 52. Numbers 1 through 8 at various ones of the above-mentioned components indicate where control signals from the control logic subsystem 30 may be applied as well as which components may transmit signals to the control logic subsystem 30. An important feature of the RS-232 transceivers 46 and 48 is their ability to sense when a valid RS-232 input voltage is present at any of their pins. For this purpose, one specific model of RS-232 transceiver that is especially well suited for the present application is a 3Driver/5 Receiver SP 3243E "intelligent" RS-232 transceiver available from several vendors as drop in replacements for one another. The vendors and models include Maxim MAX3243, Texas Instruments MAX3243, Sipex SP3243, Intersil ICL3243, and Exar SP3243E. This specific model of RS-232 transceiver, that will be referred to as the "model 3243" type of transceiver, has a "Status" output (pin 21 on the SP3243E RS-232 transceiver) that indicates whether a valid RS-232 voltage is present at any of its input pins. This detection feature was principally intended for low power applications where it is desired to power down the RS-232 transceiver when no serial cable is plugged into the serial port that is in communication with the RS-232 transceiver. The operation of the present appliance 10, however, takes advantage of the fact that normal 10/100 Ethernet voltages fall outside (i.e., below) the range of valid RS-232 signal levels. Accordingly, the "Status" output pin of the SP3243E RS-232 transceiver will not falsely detect Ethernet signals as valid RS-232 signals, as the voltages associated with the Ethernet signals will be below those of valid RS-232 signals. This feature allows use of the RJ-45 port 12 to bidirectionally communicate Ethernet signals to and from the appliance 10 without the two RS-232 transceivers 46 and 48 recognizing the presence of the Ethernet signals and falsely interpreting the Ethernet signals as RS-232 signals.

Referring further to FIG. 2, the two semiconductor relays 34 and 36 are shown in their default positions (i.e., in Ethernet "mode"). Power to the DRIP 20 is disabled as a result of transistor switch paths 38-42 being in the positions shown in FIG. 2. Pins 1, 2, 3 and 6 from the jack that forms the RJ45 port 12 are connected to the Ethernet transformer 44. Both of the RS-232 transceivers 46 and 48 will be shut down. No signals will be present on pins 5, 7 and 8, and pin 4 is tied to ground. If the DRIP 20 is the component which is coupled to the RJ-45 port 12, then the DRIP 20 will receive power from the USB port of the device, which in one example could be the USB port 18 of server 14 as shown in FIG. 1. The main processor 32 will virtually immediately recognize that an Ethernet device (i.e., the DRIP 20) has been connected to the RJ-45 port 12 as it starts communicating with the DRIP 20. In a very short time period (typically within several seconds) the main processor 20 will recognize that the Ethernet device is the DRIP 20, and will then provide a control signal to the control logic subsystem 30 that closes transistor switch paths 38 and 40, as well as transistor switch path 42. This causes DC power (typically +10.8 volts) to be applied to pins 7 and 8 of the RJ-45 port 12 to be used by the DRIP 20 if needed, and supplies an added ground return path (in addition to that of the hard-strapped RJ-45 pin 4 ground return path) on pin 5 of the RJ-45 port 12. If the session with the DRIP 20 ends for any reason (e.g., the DRIP 20 is unplugged from the RJ-45 port 12), then the main processor 32 will automatically and virtually immediately signal the control logic subsystem 30 to turn off power to the DRIP 20 by deactivating transistor switch paths 38, 40, and 42. This interrupts the application of DC power to pins 7 and 8 of the RJ-45 port 12 and interrupts the ground path to pin 5. Those pins 7, 8, and 5 of RJ-45 port 12 will then see an open circuit of high impedance, with regard to the DRIP powering circuitry of the appliance 10.

If the DRIP 20 is physically connected to the jack that forms the RJ-45 port 12 but there is no Ethernet activity detected to be occurring on the RJ-45 port 12 (from the DRIP 20 or from any other Ethernet device), the main processor 32 will send an "autosense" command to the control logic subsystem 30. This causes the control logic subsystem 30 to turn off DRIP 20 power by deactivating transistor switch paths 38, 40, and 42, as well as to power down both RS-232 transceivers 46 and 48. The first semiconductor relay 34 will be left as shown in FIG. 2 connecting pins 1 and 2 of the RJ-45 port 12 to the Ethernet transformer 44. However, the control logic subsystem 30 will cause the second semiconductor relay 36 to be switched to a "serial mode". This couples pin 3 of the RJ-45 port 12 to the TXD pin of RS-232 transceiver 46 and to the RXD pin of RS-232 transceiver 48. It also couples pin 6 to the RXD pin of the RS-232 transceiver 46 and to the TXD pin of the RS-232 transceiver 48. The main processor 20 will then check the status signals from the RS-232 transceivers 46 and 48 to look for the presence of valid RS-232 voltage level signals on the RXD or TXD pins of either RS-232 transceiver 46 or 48.

If the main processor 32 detects the presence of a valid RS-232 voltage level signal on the RS-232 transceiver 46, which means a valid RS-232 level signal on pin 6 of the RJ-45 port 12 is present, this indicates that a connection has just occurred with a serial device having an ACS pinout. The main processor 32 then enables (powers up) the RS-232 (ACS) transceiver 46 and generates a control signal to the control logic subsystem 30 to switch the semiconductor relay 34 to serial mode, as indicated in phantom in FIG. 2. This connects pins 1 and 2 of the RJ-45 port 12 with the RTS and DTR pins of the RS-232 (ACS) transceiver 46. Serial communications will then be fully enabled using the RS-232 (ACS) transceiver 46.

If the status signal from the RS-232 (Alt) transceiver 48 indicates that a valid RS-232 level voltage signal has been received on its RXD input via pin 3 of the RJ-45 port 12, then the main processor 32 powers up the RS-232 (Alt) transceiver 48 and generates a control signal to the control logic subsystem 30 that is used to switch the semiconductor relay 34 to the serial mode, which is shown in phantom in FIG. 2. In the serial mode pins 1 and 2 of the RJ-45 port 12 are connected with the CTS and DCD/DSR pins of the RS-232 (Alt) transceiver 48. Pins 3 and 6 of the jack forming the RJ-45 port 12 will be connected through the semiconductor relay 36 with the RXD pin and TXD pin, respectively, of the RS-232 (Alt) transceiver 48. Serial communications will then be fully enabled using the RS-232 (Alt) transceiver 48.

If both RS-232 transceivers 46 and 48 generate status signal outputs to the main processor 32 that indicates that valid RS-232 level voltage signals are being received on their inputs, then it is understood that an invalid serial pinout is being used on the RJ-45 plug that has been coupled to the RJ-45 port 12. In this instance both RS-232 transceivers 46 and 48 will be left powered down by the main processor 32.

If one or the other of the RS-232 transceivers 46 or 48 is operating but then the RS-232 level signals are lost, such as if the RJ-45 plug is removed from the RJ-45 port 12, then the main processor 32 sends a control signal to the control logic subsystem 30 that causes it to switch the semiconductor relay 36 back to the Ethernet mode (shown in solid lines in FIG. 2). The main processor 32 then waits for a short amount of time, for example 5 seconds, and then shuts down both of the RS-232 transceivers 46 and 48. Thereafter, the semiconductor relay 36 will be switched back to the serial mode (shown in phantom in FIG. 2) and the autosensing of the status outputs of both RS-232 transceivers 46 and 48 will continue until either an Ethernet signal is detected or a valid RS-232 voltage signal is detected, as described above.

It is important to note that the appliance 10 is able to distinguish between ACS and Alt serial pinouts because there are no RJ-45 pins that are inputs in both the ACS and Alt pin-out configurations. So only one of the two RS-232 transceivers 46 or 48 will detect valid RS-232 signal input levels when one or the other of the ACS or Alt pinouts is used.

If an Ethernet device is connected to the RJ-45 port 12, it will not be detected as a serial device, and the above described operational sequence will reach the implementation of the 5 second delay time. This delay time allows the Ethernet MAC/PHY 52 time to establish a link. When the main processor 32 sees an Ethernet link, it will tell the control logic subsystem 30 to stop autosensing and stay in Ethernet mode. At any point during the above described operations, the main processor 32 may query the control logic subsystem 30 to determine the state of the RJ-45 port 12 or to force it into a particular mode.

The autosensing feature of the appliance 10 thus provides a significant and highly advantageous means for monitoring and immediately detecting the presence of an Ethernet device or a serial device that has been connected to its RJ-45 port. An even further advantage is that the appliance 10 of the present disclosure is able to automatically sense the specific pinout (i.e., either an ACS or Alt pinout) of a serial device that has been connected to its RJ-45 port, and to accommodate the sensed pinout without the need for the data center individual to set any configuration switches on the appliance 10 or to otherwise take any other action. The ability to transmit both Ethernet and serial protocol signals over a single port can also allow the use of a single 1-U height appliance to be used in a rack and have the ability to flexibly build a connection system using only Cat5 cables (no dongle devices, RIPs or DRIPs) to any combination of Ethernet-interfaced service processor ports or RS232 ports of Alt or ACS pinouts. The serial ports can be used with other DB-connector-interfaced serial ports with RJ-45 to DB adapters. And, where KVM is needed, DRIPs may be used on any of the ports (as all support Ethernet) of the appliance 10, and can be installed initially or added in later in the case of using what was a service processor port.

Figure 4:
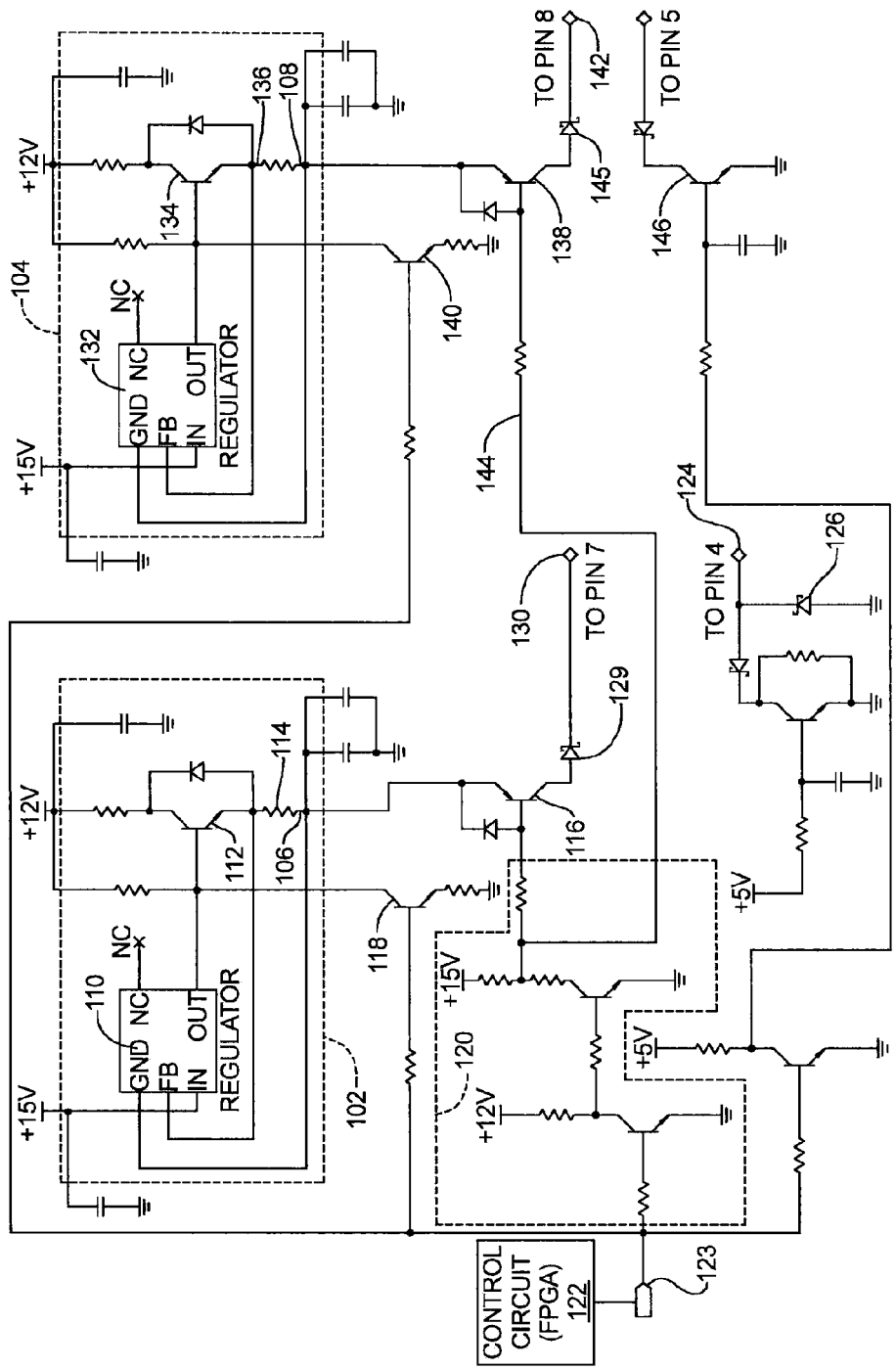
FIG. 4 is an electrical schematic diagram illustrating a power backup subsystem of the appliance that is able to automatically apply power to a DRIP if the DRIP loses its power from the serial port of a server while a session is in progress.

Referring now to FIG. 4, a backup power subsystem 100 of appliance 10 is shown. The backup power subsystem 100 is provided for generating a backup power source to the DRIP 20, and thus for the purpose of the following discussion it will be assumed that the connection scheme shown in FIG. 1C is being implemented. In other words, the DRIP 20 is interfacing the appliance 10 to the USB port 18 and the VGA port 24 of the server 14.

In the connection scheme of FIG. 1C, power will be drawn from the USB port 18 of the server 14 to power the DRIP 20 during normal operation. In the event the server 14 shuts down and the power from the USB port 18 is lost, the backup power subsystem 100 will provide sufficient power to maintain the DRIP 20 powered up, and thus maintain the existing session with the DRIP 20. To accomplish this the backup power subsystem 100 may incorporate a first shunt current regulator subsystem 102 (hereinafter simply "regulator subsystem 102") that generates an output at point 106 that is connected to pin 7 of the RJ-45 port 12 (i.e., the jack that forms the port), and a second shunt current regulator subsystem 104 (hereinafter "regulator subsystem 104") that generates an output at point 108 that is connected though transistor switch paths to pin 8 of the RJ-45 port 12. Pin 4 of the RJ-45 port 12 is tied to the appliance 10 digital ground through rectifier diodes for a return current path from the DRIP 20. Pin 5 of the RJ-45 port 12 is tied to the appliance 10 digital ground through a transistor switch path for a return current path from DRIP 20. In this example the construction of the two regulator subsystems 102 and 104 is identical, but they need not be identical.

The regulator subsystem 102 includes a precision shunt current regulator 110 (hereinafter "current regulator 110"), a first (pass through) transistor 112, and a current sensing resistor 114. The regulator subsystem 102 supplies current to a second (switching) transistor 116. A third (shutdown) transistor 118 (shown as an NPN transistor) is used to override normal regulation operation of the first transistor 112 for turning off the regulator's output of current entirely, which will be described in greater detail in the following paragraphs.

A biasing network 120, responsive to a signal from a control circuit 122, operates the switch transistor paths, turning on or off the voltage to the DRIP 20 from the appliance 10 at the RJ-45 port 12 by either allowing or shutting off the flow of current through the two send paths going to pins 7 and 8 of the RJ-45 port 12, as well as allowing or shutting off the flow of current through the one return path from pin 5 of the RJ-45 port 12. Pin 4 of the RJ-45 port 12 always allows a current return path, as it is used both as a ground in the RS232 operation of RJ-45 port 12 and the currently described DRIP 20 powering operation. In one implementation the control circuit 122 may comprise a field programmable gate array (FPGA). The signal from the control circuit 122 applied to circuit point 123 also controls on and off operation of the second transistor 116. In one specific form, a 3.3v TTL/IO pin of the FPGA may be used that controls the control input to circuit point 123. Pin 4 of the RJ-45 port 12 is tied to circuit point 124, which in turn is tied to ground through a pair of Schottky diodes 126 and 128. Another Schottky diode 129 is at output 130, which is tied to pin 7 of the RJ-45 port 12. This prevents current from flowing back into the output 130.

The regulator subsystem 104 is essentially identical to regulator subsystem 102 in construction and includes a precision shunt current regulator 132 (hereinafter "current regulator 132"), a first (pass through) transistor 134, and a current sensing resistor 136. The regulator subsystem 104 provides current to a second (switching) transistor 138. A third (shutdown) transistor 140 (shown as an NPN transistor), responsive to signals from the control circuit 122 applied to its base, can override normal regulation of the first transistor 134 for turning off the regulator's output of current entirely. The second transistor 138 forms a switch to control the output current flowing to output 142, which is coupled to pin 8 of the RJ-45 port 12. The biasing of second transistor 138 is also controlled by the biasing network 120 via circuit line 144. A Schottky diode 145 is placed in series with the output 142 to prevent current from flowing into the output.

It will be appreciated that the operation occurring at regulator subsystem 104 and output 142 will be identical to that described above for regulator subsystem 102 and output 130. The current regulator 110 of the regulator subsystem 102, in one implementation, may comprise a CAT 102TDI-G precision regulator available from ON Semiconductor, Inc. of Phoenix, Ariz. The CAT 102TDI-G precision current regulator includes a built in comparator and generates a precision 0.6v internal precision reference voltage that its internal comparator uses to control its output on pin 3 thereof.

Initially it will also be understood that since the backup power subsystem 100 is intended to only supply "backup" power to the DRIP 20, several conditions preferably exist before any power is applied by the backup power subsystem 100 to the outputs 130 and 142. During normal operation when the DRIP 20 is in use it will be drawing power from the USB port 18 of the server 14. This also lessens somewhat the burden on the power supply (not shown) of the appliance 10 during normal operation when the DRIP 20 is being used. A first required condition may be that before power is applied to outputs 130 and 142, that there be an Ethernet sync indication present in the Ethernet MAC/PHY of an Ethernet device. This sync indication is available to the CPU of the appliance 10 through query of that Ethernet device. Unless and until such an Ethernet sync signal is present, the backup power subsystem 100 will preferably not apply power to the outputs 130 and 142, and would not switch in a ground return path on the RJ-45's pin 5 (through transistor 146). A second condition that preferably is present before the backup power subsystem 100 begins applying power to the DRIP 20 is that there has been a confirmation by the appliance 10 that the DRIP 20 is actually the component that is coupled to the RJ-45 port 12 of the appliance 10. That confirmation may be in the form of receipt of embedded code from a processor or other component within the DRIP 20 that is received and recognized by the main processor 32 of the appliance 10. Such code will confirm to the appliance 10 that it is in fact the DRIP 20 that is actually coupled to its RJ-45 port 12 and not some other type of Ethernet device. Lastly, the third condition that preferably exists is that there be a KVM remote session in progress involving a remote user using the appliance 10 and DRIP 20 to access the server attached to DRIP 20. This could happen with a user at the appliance 10 using a local access, but would most commonly occur with a remote user over an Ethernet and/or internet connection using remote access software that accompanies the appliance 10. Preferably the remote user will be logged in to the appliance 10 and will be using the DRIP 20 to communicate information between the KVM/USB interface of the DRIP 20 and the server 14. Preferably only when these three conditions are all present will the backup power subsystem 100 of the appliance 10 begin applying power to pins 7 and 8 and switch in the ground return path on pin 5 of the RJ-45 port 12 on the appliance 10.

The voltage that will be output to pins 7 and 8 of the RJ-45 port 12 should preferably be sufficiently large to overcome the line losses that may be expected to occur over the length of the cable (in this example over the "Send" and "Return" wires of a Cat5 cable) that is being used to couple the DRIP 20 to the RJ-45 port 12 of the appliance 10. The length of such a cable may extend up to an industry standard of 330 feet (about 100.5 meters). It is preferred that the output voltage at pins 7 and 8 of the RJ-45 port 12, relative to ground, will preferably be somewhat less than +12 volts, and in this example that voltage will preferably be about +10.8 volts. This is achieved by the four voltage drops across the first transistor 112, the current sensing resistor 114, the second transistor 116, and the diode 129 as they relate to output 130, and also by the four voltage drops across components 134, 136, 138 and 145. The +10.8 volt output produced is anticipated to be ample to compensate for anticipated line losses in the Cat5 cable, even when the cable extends up to 330 feet in length, while still being below a the clamp voltage determined by a set of protection device's (ESD/clamp diodes) that are referenced to a +12 volt chassis voltage being supplied by a supply (not shown) of the appliance 10. The clamp voltage is highly desired to protect the previously mentioned model 3243 RS232 transceivers, for both electrostatic discharge (ESD) and for some RS232 levels that could legally be transmitted into the RJ-45 port 12 from serial devices that could be connected to the RJ-45 port 12 (but, while adhering to the upper voltage of the RS232 spec, the RS232 voltages could be of a great enough magnitude to potentially damage the model 3243 RS232 transceivers). Dropping the output of the voltage used to back power the DRIP 20 from the appliance 10 below the positive direction clamp voltage achieved with clamp diodes and a +12v potential to clamp to prevents a constant clamping of the DRIP 20 back-powering voltage put out on the RJ-45 Port 12, pins 7 and 8. This +10.8 volt backup supply voltage also leaves sufficient "headroom" in the backup supply voltage at the DRIP 20 so that the backup supply voltage can be regulated down to a lesser, suitable supply voltage by an internal voltage regulator circuit within the DRIP 20.

Turning now to operation of the backup power subsystem 10, it will be assumed that the three conditions described above are in place and that the backup power subsystem 100 is generating a backup power signal to pins 7 and 8 of the RJ-45 port 12 (i.e., at outputs 130 and 142). The first transistors 112 and 134 will each be in saturation, the second transistors 116 and 138 will both be turned on as a result of the signal being applied by control circuit 122 to point 123. The third (i.e., shutdown) transistors 118 and 140 will both be non-conducting at this point. Transistor 146 will also be in a conducting state as well via a signal from the control circuit 122 applied at circuit point 123, thus coupling pin 5 of the RJ-45 port 12 to ground. Pin 4 of the RJ-45 port 12 will be tied to ground via the Schottky diodes 126 and 128 that are connected to circuit point 124. Pin 4 is tied to ground whether the appliance 10 is operating strictly with a serial connection to some external serial device or operating with the DRIP 20. In effect, pin 4 is rectified to ground for serial operation by the use of the two Schottky diodes 126, 128 configured as shown. Pin 4 of the RJ-45 port 12 and the transistor switched in path of pin 5 of the RJ-45 Port 12 form return paths for current being used to power the DRIP 20 when the DRIP 20 is actually drawing power from the backup power subsystem 100. Schottky diodes 126 and 128 form a full wave rectifier for RS232 currents on RJ-45 port 12 pin 4, such that return currents can be either positive or negative in direction of flow. This satisfies the direction of flow needed on pin 4, and path, for both RS232 currents and DRIP 20 power return currents. This configuration is always in place for RJ-45 port 12 pin 4, regardless of what the operation of RJ-45 Port 12 is. That operation includes RJ-45 port 12 being in a service processor Ethernet mode of operation, a KVM mode of operation (with back power on or not), or if that RJ-45 Port 12 is in a serial mode of operation. RJ-45 port 12 pin 5's return path need only deal with the one direction of current flow that it satisfies with the one diode between pin 5 and transistor 146, and the transistor 146, as that pin 5 is only ground for the one mode of KVM and DRIP back powering.

When the DRIP 20 loses its primary power from the USB port 18, it will then start drawing current from pins 7 and 8 of the RJ-45 port 12 (i.e., from outputs 130 and 142). The backup power subsystem 100 provides the advantage that it allows a slight "surge" of current beyond the designed for 100 ma output from each of pins 7 and 8. This is due to the regulator subsystems 102 and 104 being shunt regulators that provide constant current past their set point of shunting (100 mA in this case), and any additional loading that would desire greater current will cause a drop in the output voltage of the regulators (and ultimately the outputs of 130 and 142 to RJ-45 port 12 pins 7 and 8, respectively). As the DRIP 20 starts drawing current, the current regulators 110 and 132, the first transistors 112, 134 and the current sense resistors 114, 136 allow the current being drawn by the DRIP 20 to rise momentarily above a predetermined maximum current set by the value of the sense resistors 114, 136 and each regulator circuit's +0.6v precision reference voltage that these reference voltages are being compared to by the internal comparators. The current being drawn then settles down at some value below the predetermined maximum current in a normal operating DRIP 20 powering scenario. In this example the sense resistors are each shown as 6 ohm resistors, which provides an output current at each of pins 7 and 8 of the RJ-45 port 12 of up to 100 ma (i.e., on each "Send" wire of the Cat5 cable). If an output current of 200 ma is desired at each of pins 7 and 8, then the sense resistors 114, 136 may be changed to 3 ohms. A current of 100 ma per each Send wire of the Cat 5 cable provides the DRIP 20 with up to about 1 watt of power that it may draw, with max cable length (with max drops of line loss in each direction), before the shunt operation of the current regulators 110, 132 begins to shunt voltage while maintaining the max current being drawn. However, it is anticipated that most DRIPs designed to work with this system will require 1 watt or less for operation in low-power mode (while being back-powered). So, even at the max specified operational length of 330 ft of Cat5 cable between the appliance 10 and DRIP 20, 1 watt will be sufficient to maintain the DRIP 20 powered on in low power mode after the USB power is lost. To provide 1 watt at the load of the DRIP 20, the maximum power available from the current regulators 110, 132 to the DRIP 20 is selected such that the DRIP 20 is only able to implement a desired "low power mode" of operation where only some limited functionality is provided for the DRIP 20. The regulators are able to be changed to allow for greater values of current allowed to the DRIP 20 by a change in the sense resistor values at 114 and 146, were there to be a desire for that later. So while the limited functionality of the DRIP 20, while it is being back powered from the appliance 20, may give up some performance capabilities (e.g., KVM video sampling), the DRIP 20 nevertheless stays powered up. The DRIP 20 is able to turn on the KVM video sampling so quickly that, when the USB power from the server 14 does comes back on, the video of the BIOS screen will be caught.

When the current being drawn by the DRIP 20 rises to a maximum level greater than what was agreed upon (and what the resistor 114 and 146 settings allow for without shunt regulation occurring), in this example enough greater than the shunt setting of 200 ma total from the two current regulators 110, 132 that the shunting begins occurring, then the internal transistor in each current regulator will start to pull out of saturation. It will pull out of saturation gradually, if the load applied by the DRIP 20 increases gradually, or it will do so abruptly if the load applied by the DRIP 20 increases abruptly. As the load increases past the 100 ma limit per regulator, the voltage at the emitter of each first (i.e., pass) transistor 112, 134 will begin to drop. The drop will be gradual if the increase in load is gradual and abrupt if the increase in load is abrupt. The more load that the current regulator 110, 132 sees, all the way up to a short circuit condition, the more that the emitter voltage will drop on the first transistors 112, 134, until the emitter voltage of each first transistor 112, 134 goes to virtually zero. And at that lowest output voltage from each transistor 112, 134, there will still be the maximum shunt current being supplied to the DRIP 20. That is, in this short circuit condition, if there is only 1v or less output from 112, 134, then out of pins 7 and 8 of RJ-45 port 12, there is still the 100 mA per each of pins 7 and 8 being supplied to the shorted condition on those pins. However, the result of this approach is that any usable power will be essentially turned off to pins 7 and 8 of the RJ-45 port 12 if a short circuit condition occurs in the DRIP 20. The DRIP 20 cannot use the small amount of voltage present at the RJ-45 port 12, or at DRIP 20 end of the Cat5 cable (which would be even less in potential), to create its voltage rails for operation, regardless of the current available at the DRIP 20, when the regulators have fully shunted their voltage outputs in appliance 10. If the short circuit condition goes away gradually, power to the DRIP 20 will be returned gradually (and eventually can become usable power to the DRIP 20), and if the condition releases from being shorted abruptly, the power available to the DRIP 20 will be returned to totally usable power just as abruptly.

Now consider the situations where the DRIP 20 is connected to the RJ-45 port 12 and operating normally (i.e., being powered by the USB port 18 of the server 14), or whether the DRIP 20 is being powered by power from the backup power subsystem 100. In either situation, if the DRIP 20 is then unplugged from the RJ-45 port 12, this condition will be sensed virtually immediately by the main processor 32 (FIG. 1) by the loss of the Ethernet session with the DRIP 20 (from seeing a loss of sync in the MAC/PHY that is used in the appliance 10 for RJ-45 port 12's Ethernet operation). The main processor 32 communicates this condition to the control circuit 122. The control circuit 122 applies a signal to circuit point 123 so that current flow to pins 7 and 8 of the RJ-45 port 12 is interrupted virtually immediately. This is accomplished by the signal applied to circuit point 123 turning off switch transistors 116, 138, 146, thru the biasing network of 120. Also, the regulator's "turn-off" transistors 118 and 140 are driven to saturation (i.e., turned on), which pull out of saturation completely the current regulator's pass transistors 112 and 134. The minimum of those transistors just mentioned required to change state to turn off of DRIP powering would be switch transistors 116, 138, and 146. The added shut down of the regulators is included as an added precaution with no appreciable added cost. The action of turning off the transistors 116 and 138 which quickly interrupts current flowing to outputs 130 and 142, and thus virtually immediately removes power from pins 7 and 8 of the RJ-45 port 12. As such, there is no reasonable possibility of an individual inadvertently damaging some external device by unplugging the DRIP 20 from the Cat5 cable and then plugging the Cat5 cable in to a different component, or unplugging the Cat5 cable from the appliance's 10 RJ-45 port 12 and plugging in a cable connected to some other device.

Finally, and as mentioned above, no power will be applied to pins 7 and 8 of the RJ-45 port 12 until the three above-explained, predetermined conditions are present (i.e., DRIP 20 plugged in to RJ-45 port 12 with and its identity recognized by the main processor 32 and a session in progress). During this state the two shutdown NPN transistors 118 and 140, will be turned on, which turns off completely the pass transistors 112 and 134. And switch transistors 116, 138, and 146 are all turned off. Only when the three predetermined operating conditions with the DRIP 20 are satisfied will (1) the shutdown transistors 118 and 140 be turned off and (2) the switch transistors 116, 138, and 146 be turned on, thus allowing voltages to be developed at outputs 130 and 142.

From the above it will be appreciated that the backup power subsystem 100 forms a highly effective means for providing backup power to the DRIP 20 in the event the DRIP 20 should lose power from the USB port 18 of the server 14 while an Ethernet session is taking place, such as when the server goes down. This is a significant advantage as it allows a user to still use the DRIP 20 to maintain the user's Ethernet session, and thus to maintain communications with the server 14 remotely via the appliance 10 when the server 14 is re-booting. Of particular importance, this feature allows the user to see the BIOS screen generated by the server 14 as it re-boots. The backup power subsystem 100 is also highly advantageous in that it virtually immediately removes backup power being applied at pins 7 and 8 of the RJ-45 port 12 in the event that a session with the DRIP 20 is lost for any reason (such as if the DRIP 20 is unplugged from the appliance 10). Still further, the backup power subsystem 100 will not apply any backup power to the pins of the RJ-45 port 12 unless the main processor 32 has verified that it is communicating with the DRIP 20 and an Ethernet session is in progress. These additional safeguards ensure that there is virtually no chance that the backup power supplied by the appliance 10 can be inadvertently applied to some other component besides the DRIP 20.

The ability to provide backup power to the DRIP 20 also may enhance the ease with which code upgrades may be loaded into the DRIP 20. For example, it may be possible to program the DRIP 20 such that it is able to be powered up in a limited functionality (i.e., "low power") mode by the appliance 10 when it is just coupled to the appliance 10. In other words no connection at all would be made between the DRIP 20 and the server; the DRIP 20 would simply be coupled with a Cat5 cable or other cable from an output port of the appliance 20. Then code could then be loaded into the DRIP 20 from the appliance 10. It is possible that the DRIP 20 could also be configured to allowing initial flashing of one or more internal programmable memory components through this technique.

It will also be appreciated that if the DRIP 20 is constructed with a feature of reporting back to the appliance 10 the fact that is has begun drawing power from the appliance 10, then the appliance could readily include a power budgeting feature by which the appliance 10 will only power on up to a predetermined number of DRIPs 20. This will prevent the possibility of overtaxing the appliance's 10 chassis power supplies if the total of DRIPs 20 that started drawing backup power from the appliance 10 simultaneously added up to more power than the appliance's main power supplies could sustain as added load to them (without derating the lifespan of the chassis power supply). This approach ensures there would be no chance that the main chassis power supplies of the appliance 10 is inadvertently overloaded. If all of the DRIP 20 devices connected to an appliance 10 draw low enough current to be sustained (all of them at once), then budgeting the maximum number isn't as important. However, if it's desired later to increase the current limit at the shunt regulator subsystems 102 and 104 from 100 mA per wire to a greater amount, such as to allow full power mode at the DRIP 20 devices, the entire description of the system in this document can still accommodate that. With a change in the value of the current sense resistor 114, 136 to allow more current prior to shunt operation, the current per outputs 130 and 142 could be carried up to 200 mA for send current (providing a total of 400 mA received out of two of the Cat5 wires at the DRIP 20). With that one change, all the logistics of when to turn on or off power that have been described in this document remain the same. But, budgeting how many DRIP 20 devices are on allows for the ability to run several DRIP 20 devices in this new example's full power mode (pulling twice or more the low power mode consumption of 1 W) on multiple ports of the appliance 10. This ability to budget how many of these DRIP 20 devices there are, and what they should be consuming in power from the main chassis supplies, allows for the appliance 10 to determine how many DRIP 20 devices it can allow to have power prior to overtaxing the main chassis power supplies. The allowing or disallowing of full power to the DRIP 20 devices would occur on a port-by-port basis by the appliance 10 turning on or off the backup power subsystem 100 associated with each of those ports (as described previously). And, this was done without adding current draw monitoring devices (on pins 7 and 8 of RJ-45 Port 12), per each of the Port 12 ports of the system in the appliance (for determining the total system current). This approach allows for significant cost savings in the process of power budgeting the DRIP 20 powering system.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A remote access appliance adapted to enable a keyboard, video and mouse session with a remote computing device, and further being adapted to provide back-up power to an Ethernet device in communication with an output port of the appliance, where the Ethernet device is interfacing the appliance to the remote computing device, the appliance comprising:

a back-up power subsystem including:

a powering subsystem associated with a signal line of the output port for supplying a regulated power signal to the signal line of the output port; and a controller for enabling and disabling an output from the powering subsystem when communication with the Ethernet device is interrupted; and the back-up power subsystem further operating to inhibit the application of back-up power to the Ethernet device unless a KVM session was is in progress using the appliance.

2. The appliance of claim 1, wherein the powering subsystem comprises a shunt current regulator subsystem.

3. The appliance of claim 1, wherein the controller further controls a switching element to open a current flow path in communication with the output port when the Ethernet device is drawing power from the back-up power subsystem of the appliance and then communication with the Ethernet device is interrupted.

4. The appliance of claim 3, wherein the current flow path comprises a ground signal path to a ground signal line of the output port.

5. The appliance of claim 1, further comprising an additional powering subsystem for supplying an additional regulated power signal to a different signal line of the output port, simultaneously with the regulated power signal applied by the powering subsystem.

6. The appliance of claim 1, wherein:
the appliance further comprises a main processor for detecting when the Ethernet device comprises a predetermined type of Ethernet device;
wherein the controller is responsive to the main processor; and
wherein the main processor in configured to communicate with the controller to prevent the back-up power from being applied to the signal line of the output port unless the predetermined type of Ethernet device is detected as being in communication with the output port.

7. The appliance of claim 6, wherein the controller is configured to close a ground signal line of the output port when the main processor detects that communication with the predetermined type of Ethernet device has been established via the output port.

8. The appliance of claim 7, wherein the main processor is configured to inform the controller when communication with the Ethernet device is interrupted.

9. A remote access appliance adapted to enable a keyboard, video and mouse session with a remote computing device, and further being adapted to provide back-up power to an Ethernet device in communication with an output port of the appliance, where the Ethernet device is interfacing the appliance to the remote computing device, the appliance comprising:
a back-up power subsystem including:
a first powering subsystem associated with a first signal line of the output port;
a first switching element associated with the first powering subsystem;
a second powering subsystem associated with a second signal line of the output port;
a second switching element associated with the second powering subsystem;
a controller configured to detect when the Ethernet device has been connected to the output port, and upon the detection of the Ethernet device, to control the first and second switching elements to enable regulated power signals to be applied to the first and second signal lines of the output from the back-up power subsystem;

a main processor configured:
to communicate with the controller to inform the controller when the Ethernet device is in communication with the output port; and
to detect that the Ethernet device is a digital rack interface pod.

10. The appliance of claim 9, wherein at least one of the first and second powering subsystems comprises a shunt current regulator subsystem.

11. The appliance of claim 9, wherein both of the first and second powering subsystems comprise shunt current regulator subsystems.

12. The appliance of claim 9, wherein the main processor is further configured to identify when the Ethernet device is a predetermined type of Ethernet device, and only then informs the controller that the Ethernet device is in communication with the output port.

13. The appliance of claim 10, wherein the first powering subsystem comprises the current regulator subsystem, and wherein the current regulator subsystem includes:
a shunt current regulator having a precision voltage source;
a current sensing resistor monitored by the shunt current regulator to monitor a level of current being drawn on the first signal line by the Ethernet device when the back-up power is being applied to the Ethernet device; and
a pass transistor responsive to the shunt current regulator for controlling a voltage across the current sensing resistor in response to a level of current being drawn by the Ethernet device on the first signal line; and
wherein the voltage across the current sensing resistor controls a level of the back-up power applied to the first signal line.

14. The appliance of claim 10, wherein the shunt current regulator subsystem that forms the second powering subsystem comprises:
a shunt current regulator having a precision voltage source;
a current sensing resistor monitored by the shunt current regulator to monitor a level of current being drawn on the second signal line by the Ethernet device when back-up power is being applied to the Ethernet device; and
a pass transistor responsive to the shunt current regulator for controlling a voltage across the current sensing resistor in response to a level of current being drawn by the Ethernet device on the second signal line; and
wherein the voltage across the current sensing resistor controls a level of the back-up power applied to the second signal line.

15. The appliance of claim 9, wherein the back-up power subsystem further comprises a third switching element responsive to the controller for selectively making and breaking a current flow path connection for a third signal line of the output port.

16. The appliance of claim 15, wherein the controller is configured to simultaneously cause the first and second switching elements to be opened, thus interrupting the application of power to the first and second signal lines, and to break the current flow path for the third signal line, when the Ethernet device is drawing the back-up power from the appliance and is then disconnected from the output port of the appliance.

17. The appliance of claim 9, wherein the back-up power subsystem includes a ground circuit comprising a pair of Schottky diodes that rectify a ground signal line of the output port to ground whether the output port is coupled to a serial device or to the Ethernet device.

18. A method for controlling a remote access appliance, wherein the appliance is adapted to enable a keyboard, video and mouse (KMV) session with a remote computing device, and further such that the appliance is able to provide back-up power to an Ethernet device in communication with an output port of the appliance, where the Ethernet device is interfacing the appliance to the remote computing device, the method comprising:

using a main processor of the appliance to sense when the Ethernet device is in communication with an output port of the appliance;

enabling a back-up power subsystem to apply back-up power to the Ethernet device only when the Ethernet device has been detected as being in communication with the appliance through the output port, and only when a KVM session is in progress;

using the back-up power subsystem to monitor a level of current drawn by the Ethernet device when the back-up power subsystem is powering the Ethernet device; and interrupting power from the back-up power subsystem to the output port when the Ethernet device is detected as no longer being in communication with the output port.

19. The method of claim 18, further comprising selectively opening and closing a ground signal path to the output port depending on whether the Ethernet device has been detected as being in communication with the output port.

20. The method of claim 18, further comprising using the main processor to sense whether the Ethernet device is a predetermined type of Ethernet device; and only when the Ethernet device is sensed as being the predetermined type of Ethernet device, then using the back-up power subsystem to apply back-up power to the output port.

21. The method of claim 18, further comprising using the back-up power subsystem to monitor a current level of current being drawn by the Ethernet device when the Ethernet device is being powered by the back-up power subsystem, and reducing a voltage level of a voltage being applied to a signal line of the output port as the current being drawn by the Ethernet device increases beyond a predetermined level.

\* \* \* \* \*